US007241357B2

(12) United States Patent
Roth et al.

(10) Patent No.: US 7,241,357 B2
(45) **Date of Patent: *Jul. 10, 2007**

(54) FOLDFORM LABEL LAMINATE

(75) Inventors: Joseph D. Roth, Springboro, OH (US); Paul C. Blank, LaCrosse, WI (US)

(73) Assignee: NCR Corporation, Dayton, OH (US)

( * ) Notice: Subject to any disclaimer, the term of this patent is extended or adjusted under 35 U.S.C. 154(b) by 402 days.

This patent is subject to a terminal disclaimer.

(21) Appl. No.: 10/419,449

(22) Filed: Apr. 21, 2003

(65) Prior Publication Data

US 2004/0001930 A1 Jan. 1, 2004

Related U.S. Application Data

(63) Continuation-in-part of application No. 09/775,998, filed on Feb. 2, 2001, now Pat. No. 6,596,359.

(51) Int. Cl.
*B32B 37/02* (2006.01)
*B32B 38/04* (2006.01)

(52) U.S. Cl. ...................... 156/250; 156/227; 156/248; 156/252; 156/257; 156/264; 156/390; 156/510; 283/81

(58) Field of Classification Search ................ 156/227, 156/247, 42.2, 248, 250, 252, 257, 264, 390, 156/510; 283/81
See application file for complete search history.

(56) References Cited

U.S. PATENT DOCUMENTS 3,503,835 A 3/1970 Hermannn
5,254,381 A * 10/1993 Hoffmann et al. ......... 428/41.8
5,336,541 A 8/1994 Kobayashi
5,403,236 A 4/1995 Greig
5,507,901 A * 4/1996 Limina et al. .............. 156/200
5,618,062 A * 4/1997 Mertens et al. ............... 283/67
5,633,071 A 5/1997 Murphy
5,890,743 A 4/1999 Garrison et al.
6,217,078 B1 4/2001 Roth et al.
6,268,032 B1 7/2001 Mertens et al.
6,423,391 B1 7/2002 Roth et al.
6,432,499 B1 8/2002 Roth et al.
6,596,359 B2 * 7/2003 Roth et al. ................. 428/40.1

OTHER PUBLICATIONS

Vijuk Equipment, Inc, "Vijuk G & K RS 42/880 Plough-Fed Folder," www.vijukequip.com, Sep. 24, 2000, 4 pages.

* cited by examiner

*Primary Examiner*—Nasser Ahmad
(74) *Attorney, Agent, or Firm*—Francis L. Conte

(57) ABSTRACT

A web is dispensed from a roll and includes first and second bands adjoining along a fold line. A pattern of release is applied to the front side of the web along the first band, and a pattern of adhesive is applied to the front side of the web along the second band. The web is folded along the fold line to bond together the first and second bands in a laminate, and exposing back sides of the bands on opposite sides of the laminate. The second band is cut to define a removable label therein.

45 Claims, 4 Drawing Sheets

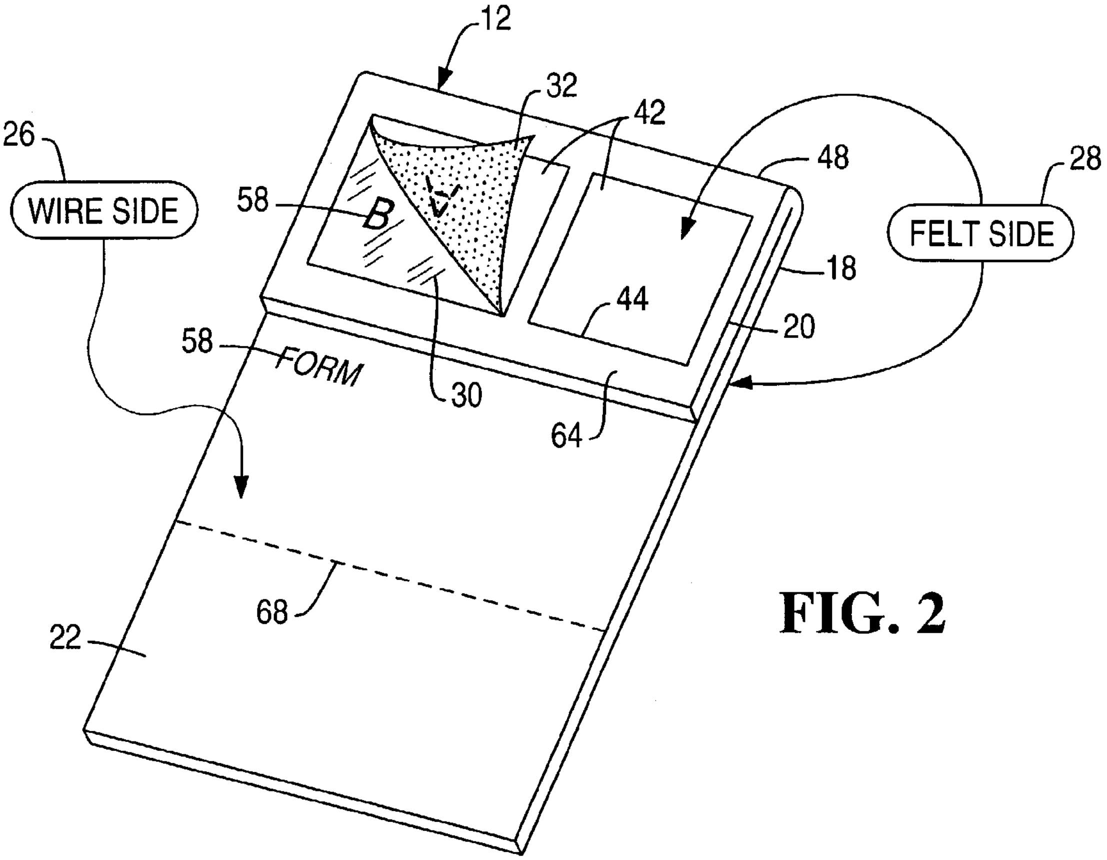
FIG. 2
FIG. 3
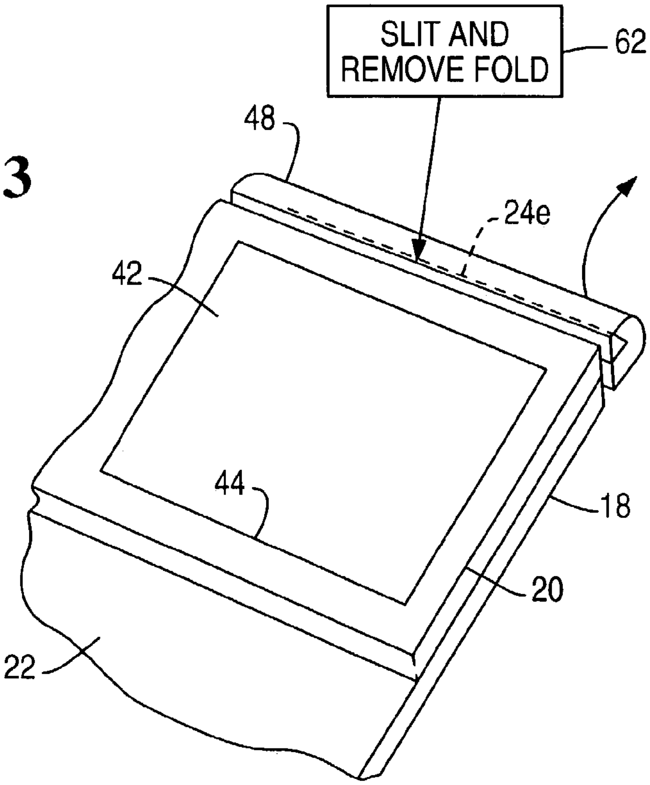

FOLDFORM LABEL LAMINATE

This application is a continuation-in-part of application Ser. No. 09/775,998, filed Feb. 2, 2001, now U.S. Pat. No. 6,596,359.

BACKGROUND OF THE INVENTION

The present invention relates generally to label laminates, and, more specifically, to manufacturing thereof.

The ubiquitous label laminate is found in various configurations for various uses, and is manufactured in various manners. The typical consumer label product is in the form of two-ply label sheet having multiple die cut labels removably bonded using pressure sensitive adhesive to an underlying liner coated with a release agent such as silicone.

The liner is typically mass produced in large rolls and then subsequently laminated to a face sheet also provided from large rolls. The laminated face sheet is then suitably die cut to define the individual labels thereon, with the laminate typically being produced in a continuous web which is then divided into sheets which are either cut or folded into stacked reams, or wound into a continuous roll.

Cut sheet labels are typically sold to consumers in stationery stores. The fan-fold and roll forms of label laminates are typically custom tailored for use by large commercial establishments for high speed use in large volume.

One variation of label laminates includes an integral form sheet extending in single ply from the two-ply laminate for providing a combined single sheet form/label configuration. These integrated sheets are typically custom tailored in configuration and size for the particular commercial customer. And, these integrated sheets are typically pre-printed with standard information such as company identification and other indicia indicative of the intended use of the sheet such as in commercial sales transactions.

The labels may be custom configured for customer and return address labels. The integral form may be configured for a packing list or invoice. And, in the typical pharmaceutical application, the various labels are specifically configured for identifying the particular pharmaceutical drug transaction, with the integral form containing use instructions and other details of the commercial drug purchase.

Since the integrated form/label sheet includes the two-ply label laminate and the adjoining single ply form sheet, the manufacture thereof is correspondingly complex, with associated cost. And, the combined one-ply and two-ply integrated sheet affects its subsequent use in printing by the intended customer in either small volume laser printers, for example, or in large volume high-speed printers.

As indicated above, pre-manufactured liner material may be laminated with pre-manufactured label material typically in continuous webs unwound from corresponding rolls. The singly ply form sheet may be suitably joined to the laminate with either a bonded lap-joint construction, or by integrating the form sheet with the face sheet defining the labels, with a liner patch laminated to the back side.

In this configuration, the liner and face sheet materials are fundamentally different from each other, even if made from ordinary paper. Ordinary paper is typically porous, which permits desirable printing thereon in various forms of printers. However, porous paper increases the difficulty of forming a suitable liner.

Liners are typically manufactured by applying a coating of liquid silicone which is then suitably cured, typically using ultraviolet (UV) light during the manufacturing process. If the paper is porous and readily absorbs the liquid silicone, the cured silicone may not form a suitable release coating for the pressure sensitive adhesive of the laminated face sheet.

Accordingly, liner material is typically formed from supercalendered kraft (SCK) paper which is pressed thinner than ordinary bond paper to prevent excess absorption of the liquid silicone during the manufacture of the release liner. In this way, a minimum amount of silicone will coat the SCK paper and will rapidly cure in the high-speed production transport thereof to form a smooth release surface having the desired release characteristics with the selected adhesive for permitting subsequent removal of individual adhesive labels therefrom.

The resulting integrated label/form sheet therefore includes a single ply face sheet for both the labels and form sheet, with a smaller patch of the thinner SCK liner bonded to the back side of the labels by the pressure sensitive adhesive laminated therebetween. Since the liner and face sheet have different material compositions and thicknesses, they are subject to undesirable curling thereof due to changes in temperature and relative humidity. Temperature and humidity cause the liner and face sheet to expand and contract differently from each other and leading to curl of the laminate which may cause misfeeding or jamming in typical printers.

One advantage of the edge joined laminate and form sheet is that a continuous web thereof may be driven through a printing press in a single pass for printing the front and back sides of the web at relatively low cost. In this way, the custom printed sheets may then be suitably packaged in stacks or rolls and sold to the corresponding commercial customer for subsequent use in laser printers or high-speed printers.

In another method of construction, the face sheet may be provided in a web and driven through the printer in one pass for printing thereof. The liner, in web form, may then be driven through the printer in another pass for printing the back side thereof as desired. And, the face sheet and liner are then laminated together with pressure sensitive adhesive therebetween in yet another processing step.

These multiple processing steps correspondingly increase the cost of production as opposed to the edge-joined production method disclosed above. However, the materials typically cost less in this multiprocess procedure as compared to the edge-joined procedure described above. Nevertheless, the multi-pass process typically results in the end product being more costly.

Accordingly, it is desired to provide an improved method of manufacturing label laminates, corresponding apparatus therefor, and the corresponding product produced thereby.

BRIEF SUMMARY OF THE INVENTION

A web is dispensed from a roll and includes first and second bands adjoining along a fold line. A pattern of release is applied to the front side of the web along the first band, and a pattern of adhesive is applied to the front side of the web along the second band. The web is folded along the fold line to bond together the first and second bands in a laminate, and exposing back sides of the bands on opposite sides of the laminate. The second band is cut to define a removable label therein.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 2 is an isometric view of one of the label laminates produced in FIG. 1 in accordance with an exemplary embodiment.

FIG. 3 is an isometric view of an enlarged portion of the laminate illustrated in FIG. 2 in accordance with another embodiment.

DETAILED DESCRIPTION OF THE INVENTION

Figure 1:
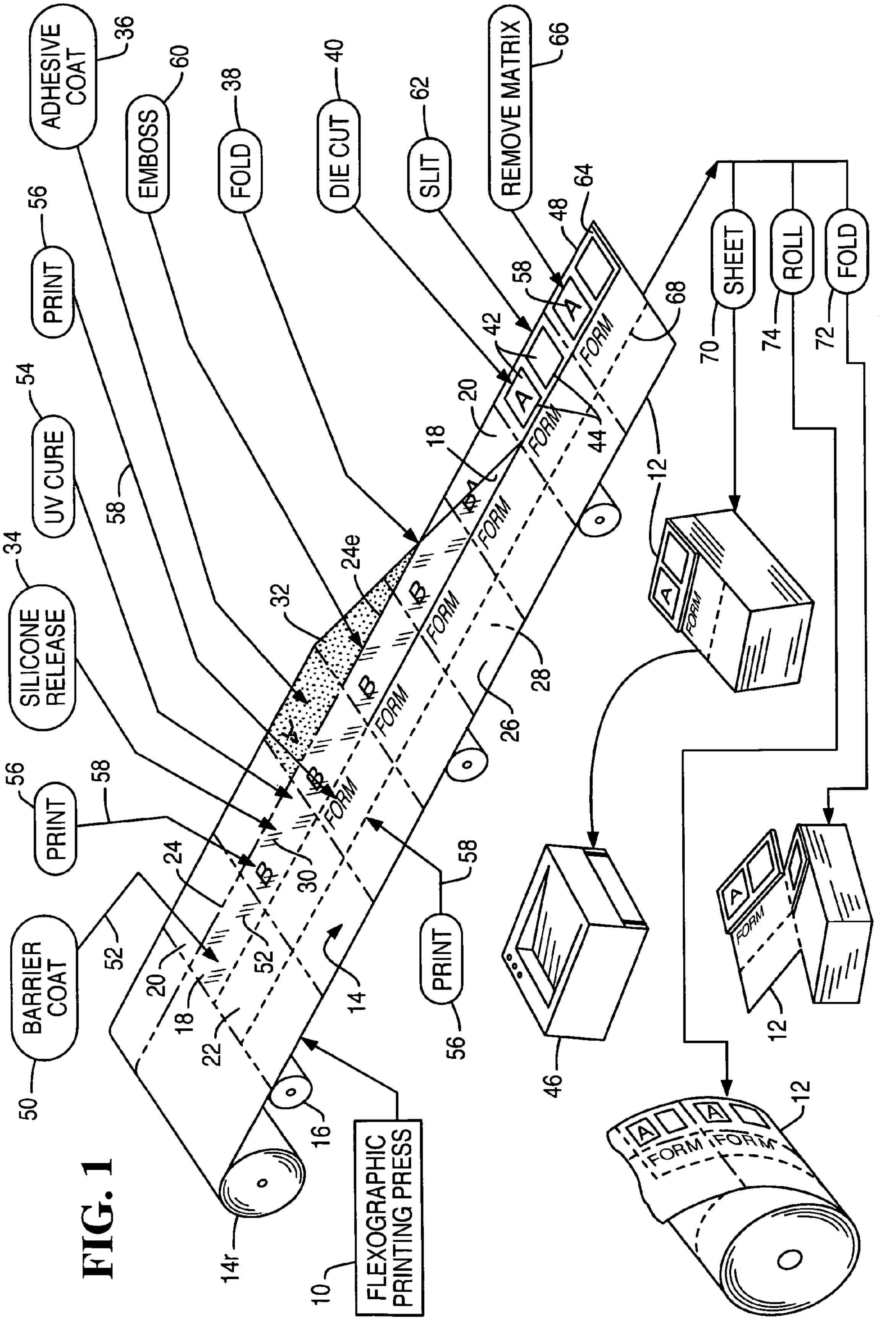
FIG. 1 is a schematic representation of an apparatus and method for making label laminates in accordance with exemplary embodiments.

Illustrated schematically in FIG. 1 is an apparatus 10 in the exemplary form of a flexographic printing press specifically configured for making a label laminate 12 in accordance with a preferred embodiment of the present invention. A web 14 of single-ply material is initially provided in a large roll 14*r* thereof. The web is mounted in the press 10, with the press including suitable means 16, in the form of driven rollers or conveyor belts, which dispense and transport the web from the roll along the entire running path through the press.

The web may have any suitable material composition for use in producing the laminates, including paper or various synthetic materials typically used in label construction. The web 14 is divided into three sections which extend longitudinally along the running or dispensing axis of the web as it travels through the press.

The web includes a first or inboard band 18 adjoining second and third outboard bands 20,22 running along laterally opposite edges thereof along the web running axis. The first and second bands 18,20 adjoin each other along a fold line 24 extending along the running axis and parallel to the three bands. The three web bands are integrally joined together in a common or unitary web and therefore having an identical or common material composition and configuration.

The web and its bands have a first or front side or surface 26 and an opposite second or back side or surface 28. In typical paper construction, the web front side 26 may be the wire screen side of the paper, with the web back side 28 being the felt side of the paper. Although the web is made of the same material composition across the bands, the front and back sides thereof are slightly different from each other due to their conventional method of manufacture.

The web includes a pattern of release 30, such as conventional silicone release agent, disposed on its front side 26 atop the inboard first band 18, and a pattern of adhesive 32, such as typical pressure sensitive adhesive, disposed also on the web front side atop the outboard second band 20.

Since the silicone release and adhesive can be initially formulated as liquids, they may be printed atop the web in conventional printing towers commonly found in flexographic printing presses such as the exemplary press illustrated schematically in FIG. 1. More specifically, means in the form of a conventional printing tower 34 are incorporated in the press for applying the desired pattern of release 30 on the web front side. Similarly, means 36 in the form of another conventional printing tower are provided in the press for applying the desired pattern of adhesive 32 on the web front side. The adhesive pattern is applied to complement the release pattern for forming the subsequent label laminates.

Accordingly, the release and adhesive patterns may be applied to the web at any desired locations thereon, including the first, second, or third bands, for the desired label laminate. And, the release and adhesive may be applied in any suitable manner, such as printing or extrusion thereof.

Means in the conventional form of a plow or plough folder 38 are also incorporated in the transport path of the press for folding the web along the fold line 24 on the run as the web is transported through the press. The web is folded along the fold line to join and bond together the corresponding front side portions of the first and second bands 18,20 into the corresponding laminate 12 thereof. In this way, the first and second bands are folded together for exposing to view the common back side portions thereof on opposite sides of the resulting laminate.

Means in the form of a conventional die cutting roller 40 are included in the press following the folding station for cutting the second band 20 to define one or more removable labels 42 therein. Each label 42 is defined by a die cut perimeter 44 in a conventional manner which permits the individual label to be peeled away from the underlying release liner when desired for subsequent use.

An exemplary one of the foldform label laminates 12 manufactured in the press illustrated in FIG. 1 is shown in FIG. 2 in more detail. The folded together first and second bands 18,20 provide a two-ply laminate, with the single-ply third band 22 extending laterally therefrom. Since the common web 14 illustrated in FIG. 1 is used for producing the entire laminate or sheet 12 illustrated in FIG. 2, the three bands thereof all have the identical material composition and configuration, with the same front and back sides 26,28. The third band 22 extends from the laminate in a single-ply which is coextensive and coplanar with the first band 18 in a unitary construction therewith, which additionally includes the folded-over second band 20.

The foldform laminate 12 illustrated in FIG. 2 enjoys significant advantages in construction, as well as being readily manufactured in a single pass through the press 10 illustrated in FIG. 1. From the plain, common web 14, a series of the laminates may be readily formed by simply folding the outboard band 20 of the web atop its inboard band 18 in a two-ply configuration, with the remaining outboard band 22 extending laterally therefrom in a single-ply.

Since the laminate 12 illustrated in FIG. 2 is formed of one, and only one material, it enjoys the same performance of the common material properties thereof. The two plies of the laminate have the same thickness and are laminated together for exposing the same, back side 28 on opposite sides of the laminated first and second bands 18,20. This exposed side may be the felt side of the paper in the example illustrated in FIG. 2 or, alternatively, it could be the wire side of the paper. In either embodiment, the configuration of the exposed opposite sides of the laminated two bands is identical, with their corresponding front sides being hidden inside the laminate along the bond formed by the release 30 and adhesive 32.

In this configuration, both bands 18,20 have the same felt surface exposed to the environment and are commonly subject to the temperature and humidity therein. As temperature changes, or as humidity changes, both bands 18,20 will behave in the same manner and thusly substantially reduce or eliminate undesirable curling of the laminate. In this way, when the so-constructed foldform laminate 12 is later fed through a suitable printer, such as the exemplary laser printer 46 illustrated in FIG. 1, misfeeding or jamming in the printer due to pre-curling will be substantially reduced.

In the preferred embodiment illustrated in FIGS. 1 and 2, the folder 38 is configured for folding the web 14 along the running fold line 24 to form or crease a uniform thickness bend or fold 48 along the outside of the internal fold line 24 for joining together the first and second bands 18,20 along a common outboard edge of the resulting laminate. The edge fold 48 is an integral or unitary part of the laminate and its adjoining first and second bands, and provides increased structural stiffness along this edge, which is typically the leading edge of the laminate configured for first entering the laser printer 46 illustrated in FIG. 1.

The integral leading edge fold 48 increases the leading edge stiffness in cut-sheet configurations of the laminate, which correspondingly reduces leading edge damage and increases transport reliability through the printer. Furthermore, the fold completely closes the laminate along the leading edge and thusly prevents squeeze-out or liberation of any of the adhesive along this edge due to rolling loads in the laser printer acting on the adhesive softened during passage past the hot fusion roller therein.

Typical pressure sensitive adhesives used in label laminates readily soften under the high temperature of the hot fusion roller in the laser printer. This is also true of many of the conventional adhesives which may be used in the foldform laminate disclosed above. The adhesives may be solvent based, water based, hot melt, warm melt, and UV cured, as well as the various pressure sensitive adhesives typically cured by ultraviolet light.

Since the web 14 illustrated in FIG. 1 is preferably selected in material composition for the desired labels and form sheet, it may not enjoy the typical properties associated with the SCK paper typically used for release liners. The web material, such as typical bond paper, may excessively absorb the liquid silicone in the manufacturing process.

Accordingly, means in the form of another printing tower 50 are incorporated in the press for applying or printing a suitable barrier coating 52 atop the first band 18 at the beginning of the transport path prior to applying the release coating on the first band. Barrier coatings are conventional and reduce absorption of the liquid silicone release by the paper web. The release coating may then be applied atop the barrier coating and suitably cured by an ultraviolet (UV) light 54 incorporated in the press following the release tower 34.

A conventional printing tower 56 may be incorporated in the press between the corresponding towers of the barrier and release coatings for printing atop the barrier coating in the first band 18 any suitable print or indicia 58 prior to applying the release 30 atop the print. In this way, the resulting laminate illustrated in FIG. 2 may have some print 58 visible through the transparent release 30 for providing security features, or printing for any suitable application. Since conventional liner material is premanufactured, it is not possible to print anything under the release coating thereof, which reduces the efficiency of the liner material in label configurations.

The barrier coating and pre-printing under the release material are optional features in the manufacturing process, and may be used to advantage where desired.

In addition to the option of printing under the release before its application, an additional printing tower 56 may be introduced in an intermediate stage of the press for suitably printing the web 14 outside the first band area occupied by the patterned release 30. This second printing tower 56 may be located immediately following the UV light station for printing the front side of the web after curing the applied release 30, and before folding the web.

Yet another third printing tower 56 may be included in the press on the opposite side of the web so that the second and third printing stations can simultaneously print both the front and back sides of the web as it is transported along the running axis. The locations of the second and third printing towers may be before the folding station as illustrated, or may be after the folding station as desired for suitably printing the web.

In this way, additional print 58 may be disposed on the front side of the third band 22, as well as on the back side of the second band 20 which later becomes laminated atop the first band. As shown in FIGS. 1 and 2, the third band 22 of the web will define the single-ply form sheets of the final label laminate and may be pre-printed during the manufacturing process of the label laminates for the intended commercial customer. The print or indicia 58 printed on both sides of the web may have any suitable form such as including identification of the commercial customer by company name and address, and any suitable information corresponding with the form or labels found in the label laminates.

For example only, one of the labels is printed with the letter "A" which is indicative of any desired printing thereon. The third band contains the print "Form" indicative of any useful information to be printed on the subsequent form sheet. And, the first band 18 is pre-printed with suitable indicia identified by the letter "B" formed below the resulting clear silicone release coating later applied in the press.

The common web illustrated in FIG. 1 is used for producing and defining individual and discrete label laminates 12 which repeat in series along the continuous web until they are later separated from each other. The release 30, the adhesive 32, and the various print 58 repeats in series along the web for the corresponding portions thereof defining the interim blanks which result in the final label laminates 12 at the end of the several stations in the press.

In order to improve the efficiency of folding together the first and second bands, the press illustrated in FIG. 1 further includes means in the form of another station including a suitable roller 60 for embossing or perforating the fold line 24 prior to folding therealong. For example, the embossing roller 60 may be used to provide a line indentation embossment of the fold line, designated 24*e*, for permitting accurate folding of the two bands therealong.

As shown in FIGS. 1 and 3, the press may also include means in the form of a conventional slitting knife 62 for cutting or slitting the folded laminate 12 along the fold line 24 and removing the edge fold 48 therefrom. Although the fold 48 may remain an integral part of the final laminate, it may be conveniently removed therefrom by the slitting station where desired. The so-slit resulting laminate will have a square leading edge as typically found in integrated form/label laminates produced by conventional methods.

The die cutting station 40 illustrated in FIG. 1 may be used to define one or more labels 42 in the laminated second band 20 in any suitable configuration and size. For example, the second band 20 may be conveniently die cut to define the two labels 42 illustrated in FIG. 1 inside a surrounding matrix 64 which typically defines unused or scrap material.

Accordingly, the press illustrated in FIG. 1 may also include suitable means 66 for pulling or removing the matrix 64 to expose the labels 42 laminated atop the first band 18. This is illustrated schematically in FIG. 4 by removal of the matrix which is readily peeled away from the underlying release coating 30 forming a weak bond with the adhesive 32 disposed behind the matrix.

Figure 5:
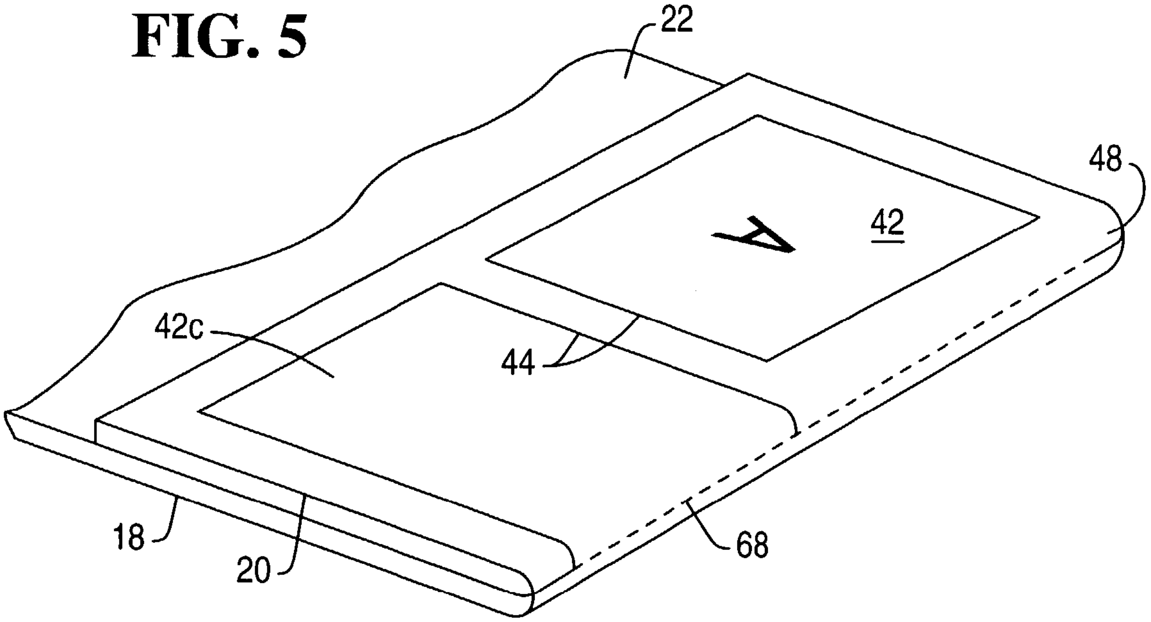
FIG. 5 is an isometric view of an enlarged portion of the laminate illustrated in FIG. 2 in accordance with another embodiment.

The embossing station 60 illustrated in FIG. 1 may alternatively be configured for perforating the fold line 24 prior to folding together the first and second bands. The resulting perforations 68 are illustrated in FIG. 5 as a line of small diecuts extending completely through the junction of the first and second bands along the hidden fold line 24 therein.

Figure 4:
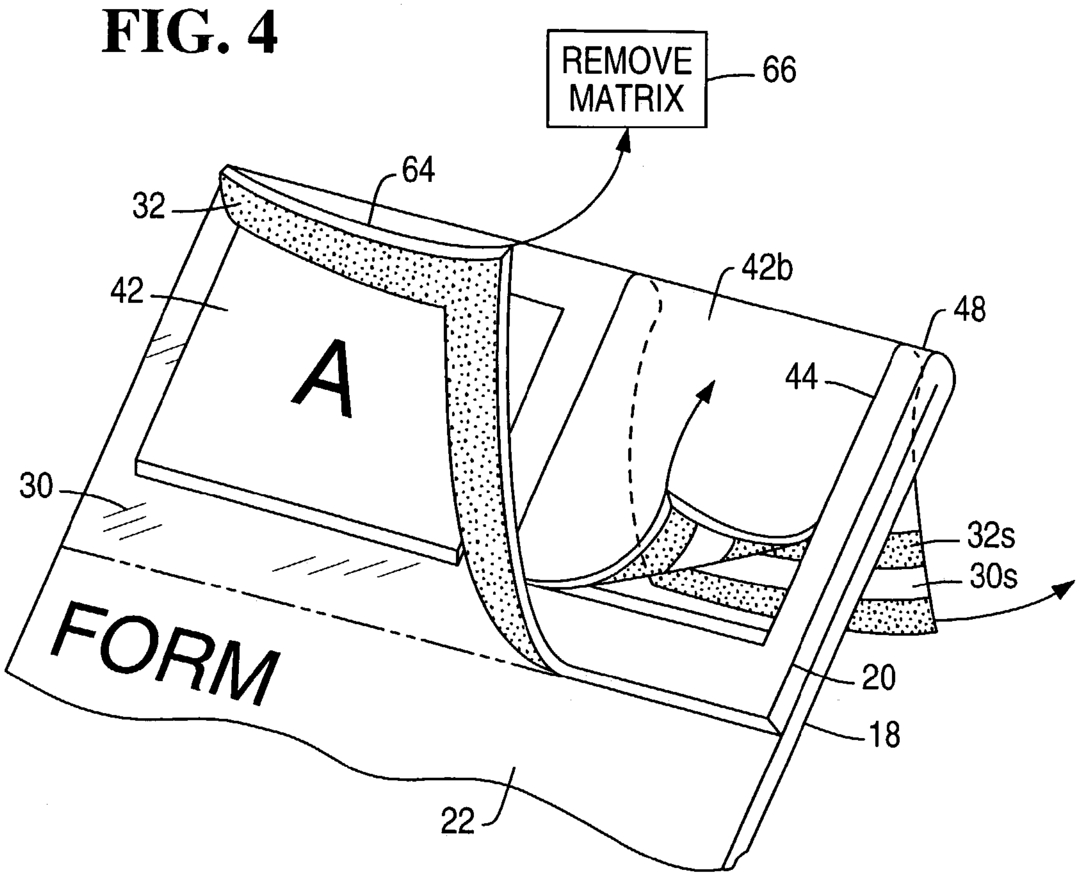
FIG. 4 is an isometric view of an enlarged portion of the laminate illustrated in FIG. 2 in accordance with another embodiment.

The fold 48 thusly includes the line of perforation 68 which may be used in the embodiment illustrated in FIG. 4 for providing a clean tear line as the matrix 64 is removed from the laminate and scrapped.

Since the entire web 14 illustrated in FIG. 1 is available between unfolded and folded states along the running axis of the press, the web may be embossed, perforated, or die cut at any convenient location in the press for any suitable purpose. Embossing and perforating the fold line have been addressed above. Die cutting the labels 42 has also been addressed above. And, the third band 22 may be conveniently die cut or perforated as desired.

For example, the third band may be perforated along the running axis which is transverse to the width of the individual label laminates, with the line of perforation 68 being suitably spaced between the trailing edge or bottom edge of the laminate defined by the lower edge of the web and the junction of the first and third bands. The third band may be perforated using the embossing station 60 before the folding process, or it may be perforated after the folding process using the die cutting station 40 as desired.

At the end of the press illustrated in FIG. 1, means 70,72,74 are provided for dividing the finally processed web into a group of individual laminate sheets 12, each sheet including a corresponding one of the labels 42 therein.

For example, a conventional sheet cutter 70 may be used for cutting the laminated web into identical and repeating laminate sheets 12, with each sheet including corresponding labels therein. The sheets are cut from the web and suitably stacked in groups or reams, which may be packaged and sold to commercial customers, or to individual consumers. Such cut sheet form of the label laminates may be typically used by the consumer in a suitable printer, such as the laser printer 46, and will enjoy the benefits from the unique and improved configuration thereof.

Alternatively, the fan folding station 72 may be used for conventionally folding the laminated web into a stack of fanfold laminate sheets 12, each including the corresponding labels therein. The fanfold laminates are typically used by commercial customers for high volume applications through high-speed printers, for example.

In yet another embodiment, the rolling station 74 may be conventionally used for rolling the laminated web 14 into a roll of the integrated laminated sheets 12, with each of the sheets including the corresponding labels therein. The individual laminate sheets may be defined by the repeating pattern of labels therein, or may be defined- by a suitable indicia between the laminates in the roll.

For example, a transverse row of perforations may be provided laterally across the width of laminated bands for permitting subsequent removal by tearing of individual sheets. However, label sheet rolls are conventional, and are typically used in commercial equipment having integral cutters therein which can repeatedly cut the roll into the individual sheets as they are printed at high volume.

The printing press 10 illustrated schematically in FIG. 1, including the many specifically configured stations thereof, permits one-pass processing of the originally plain web 14 into the final product label laminate 12 including the integrated removable labels and form sheet portion thereof. Printing of all desired indicia or print, application of the desired release agent, and application of the desired pressure sensitive adhesive are all effected in corresponding stations along the running axis and permit a great variety in final form of the resulting label laminates.

In a simple embodiment illustrated in FIG. 1, the release pattern 30 on the first band 18 is continuous, and the adhesive pattern 32 on the second band 20 is also continuous. In this way, the entire second band 20 as illustrated in FIG. 2 is adhesively bonded along the entirety of one side thereof to the release coating 30 completely covering the opposing side of the first band. The individual labels 42 are readily removable from the laminate by being peeled away therefrom in typical fashion. And, the matrix 64 may or may not be removed from the laminate as desired.

Figure 6:
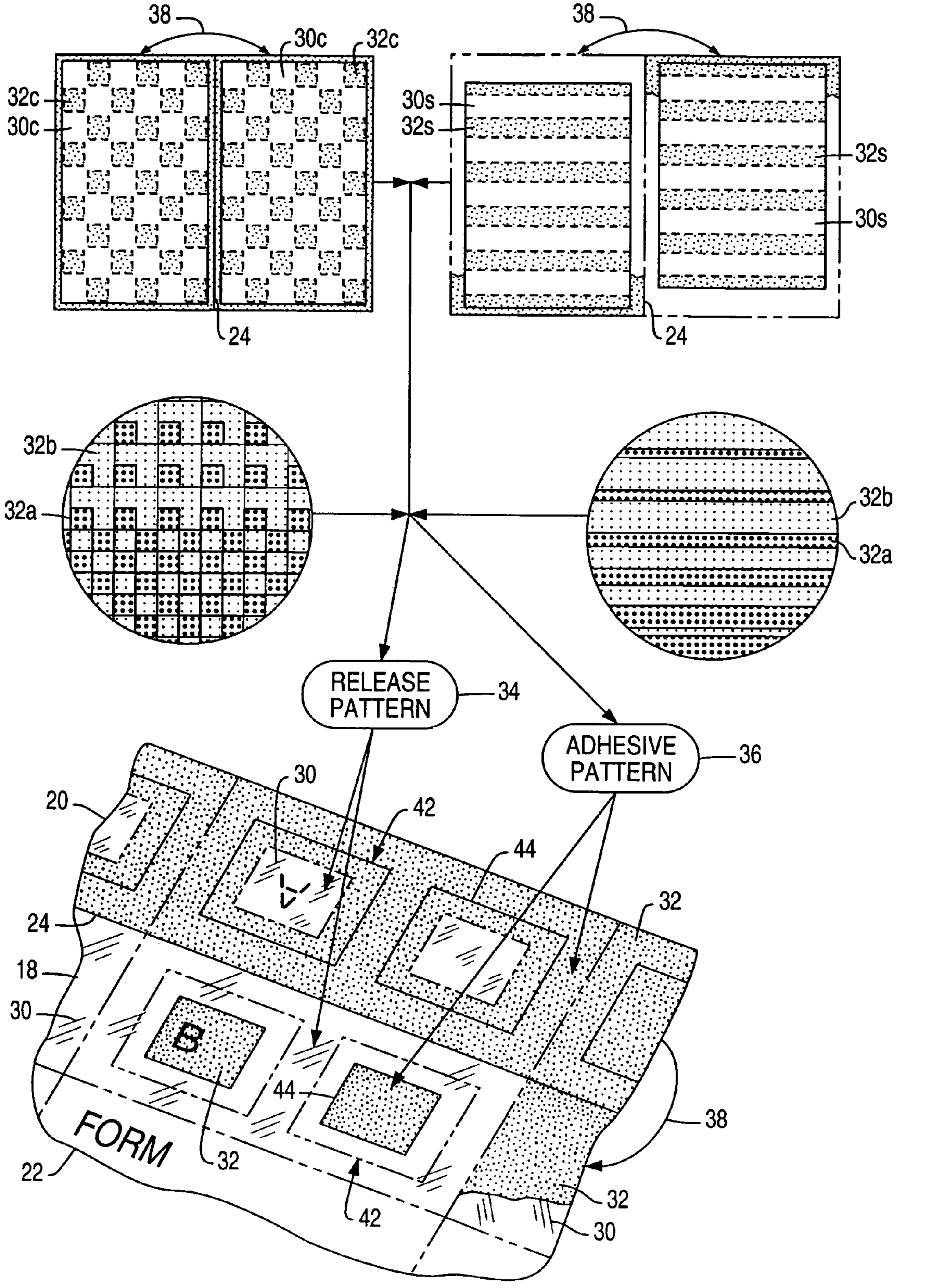
FIG. 6 is an enlarged portion of the web illustrated in FIG. 1 in accordance with additional embodiments.

FIG. 6 illustrates schematically additional patterns of the release and adhesive which may be printed atop the first and second bands using the versatility provided by the press illustrated in FIG. 1. Many of these patterns result in unique label laminates which are separately the subject of other patent applications or issued patents. Such laminates, however, may be manufactured to advantage using the newly configured press illustrated in FIG. 1.

One embodiment illustrated in FIG. 6 is the release pattern 30 on the first band 18 being discontinuous, and the adhesive pattern 32 on the second band 20 also being discontinuous. The two discontinuous patterns of release and adhesive are complementary with each other or symmetrical along the fold line 24 so that the adhesive on one band is laminated against the release coating on the other band for permitting subsequent separation of the bands at their specifically configured labels.

In this configuration, the release and adhesive patterns include complementary rectangular patches which are nested inside each other in the pre-folded configuration illustrated in FIG. 6, as well as being nested inside each other after the second band 20 is folded and laminated atop the first band 18. The die cut perimeters 44 have been added to FIG. 6 for clarity of presentation to illustrate the resulting duplex label lamination configuration in which a small label 42 in the first band 18 will nest inside the larger label 42 defined in the second band 20.

The small label 42 printed with the letter "B" includes a full coating of the adhesive which is initially laminated to the corresponding rectangle of release 30 centered inside the large label on the second band. The small label may therefore be separately removed from the large label.

However, the large label 42, with letter "A," has a perimeter band of the adhesive around the center release rectangle and may be removed from the first band and used as a typical adhesive label.

In this configuration, the release pattern 30 is repetitive along the first band 18 not only in each resulting laminate sheet but from sheet to sheet along the running axis of the web. And, the adhesive pattern 32 is similarly repetitive along the second band 20 in each sheet as well as along the running axis of the web. The repetitive release and adhesive patterns are complementary with each other over the fold line 24 so that the adhesive on one band is laminated against release on the opposite band to permit their subsequent delamination.

A particular advantage of the press illustrated in FIG. 1 is that the release 30 may be applied in a pattern atop the web front side 26 along both the first and second bands 18,20. And, the adhesive 30 may also be applied in a corresponding pattern atop the same front side 26 of both the first and second bands. The one side application of the release and adhesive is followed by folding of the first and second bands 18,20 together which is symmetrical along the fold line so that the complementary patterns of release and adhesive are laminated together.

The ability of the press 10 illustrated in FIG. 1 to precisely print the corresponding patterns of release and adhesive coatings on the two bands permits any suitable patterns to be printed. FIG. 6 illustrates yet another embodiment in which the release and adhesive patterns include complementary and alternating stripes 30*s*,32*s* which are also symmetrical to each other about the fold line 24 and may therefore be nested together in the laminated product. The nested stripes permit nested labels to be formed in both bands 18,20 which decreases scrap material associated with conventional liners which are not used as labels themselves.

FIG. 6 also illustrates another form of the release and adhesive patterns in complementary checkerboards 30*c*,32*c* which again are symmetrical about the fold line 24 and are nested together in the final product. Again, the checkerboard configuration permits the creation of labels in both bands 18,20 which are separately removable, with each label having a sufficient amount of adhesive thereon for use as a pressure sensitive label.

FIG. 6 illustrates yet another form of adhesive stripes 32*a,b* which may be formed of different adhesive compositions and strength for varying the bonding strength of the resulting label. Correspondingly, the adhesive may be printed in a checkerboard pattern 32*a,b* of different strength adhesives for again varying the bonding characteristics of the resulting label.

Furthermore, the release characteristics of the release coating may be varied as desired by using one or more different compositions for the release material in suitable patterns tailored for the specific label configuration.

FIG. 6 illustrates yet another embodiment at the right end of the web in which the adhesive 32 may be applied atop the front sides of both the first and second bands 18,20 on opposite sides of the fold line 24. In this way, the adhesive 32 may coat the two bands with half-thicknesses thereof so that when the two bands are laminated together, a full thickness of the adhesive is provided.

Note that the adhesive 32 applied to the first band 18 is applied over the release coating 30, with the adhesive being aligned along both sides of the fold line 24 to form a two-ply adhesive laminate thereof after folding together of the two bands.

When the adhesive is applied in half-thickness or half-weight to both sides of the fold line, the final adhesive coat weight is the sum of the two side coatings. This provides a benefit when using water-based pressure sensitive adhesives since thin coatings thereof dry more efficiently and quicker than thicker coatings thereof and improve the throughput capacity of the press.

Illustrated in FIG. 4 is a particularly unique form of the label, designated 42*b*, which may be created by the web folding process. For example, both the first and second bands 18,20 are die cut across the fold 48 to define a single label 42*b* which bridges both sides of the laminate and can therefore provide a correspondingly large label having greater than twice the area of either label formed alone in each of the two opposing bands.

In this configuration, the release 30*s* and adhesive 32*s* are provided in complementary striped patterns on the first and second bands to provide adhesive on both of the bands which is removably bonded to opposing release on the other band. The resulting adhesive stripes on the large label 42*b* thusly alternate from one end to the other for permitting the label to be adhesively bonded to the intended surface.

In the embodiment illustrated in FIG. 4, the release and adhesive stripes extend parallel with the fold 48 and its fold line along the running axis of the web. However, the release and adhesive stripes could be disposed perpendicular to the fold line while alternating along the running axis.

FIG. 5 illustrates yet another embodiment of the label diecuts 44 extending around the fold 48 to the line of perforations 68. The resulting label 42*c* can be slightly longer than the adjacent label 42 and can be readily peeled away from the underlying first band 18 and torn along the perforations 68. If desired, the line of perforations 68 could also be used in the large label 42*b* of FIG. 4 for providing additional advantage in the double size label bridging both sides of the laminates.

The foldform process of making the individual label laminate sheets in a continuous running web as illustrated in FIG. 1 permits one-pass production of the final laminate sheets from the single web roll, and enjoys the many benefits disclosed above. The resulting laminate sheet is formed of a single material composition from a single-lot production of the web. The differently configured wire front side 26 and felt back side 28 of the web are used to advantage in the foldform final laminate illustrated for example in FIG. 2.

The two bands 18,20 have identical material composition, with both bands having the same side exposed outwardly, with the same side being laminated together and hidden inside the laminate. Whether the exposed sides of the laminate are the wire or felt sides of the original web is irrelevant since the same side is exposed outwardly and behaves the same under changes in temperature and humidity for eliminating undesirable curling forces which would otherwise occur in different material composition or differently exposed felt or wire sides of typical label laminates.

Note in particular, that typical liner material is thin SCK paper which inherently has a different material composition than the label face sheet due to the different production thereof and the different manufacturing lots. And, the face sheet and SCK liner have their respective wire and felt sides which are different from each other and provide different performance when laminated together in the final product.

Accordingly, the foldform manufacturing process disclosed above and its corresponding apparatus, provide a new and improved manner for producing label laminates with, or without, the integral single-ply form sheets formed therewith. The resulting label laminate sheets enjoy the advantages of single-material composition, and single-side configuration of the opposite exposed surfaces. These are several of many advantages disclosed above which are attributable to the foldform process in the various forms of label laminates which may be produced therefrom.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method for making a label laminate comprising:

dispensing from a roll a web including first and second bands adjoining along a fold line extending longitudinally along a running axis, with said web and bands thereof having a front side and an opposite back side;

applying a barrier coating on said web front side atop said first band;

applying a pattern of release atop said barrier coating;

applying a pattern of adhesive on said web front side atop said second band to complement said release;

folding said web along said fold line to bond together front side portions of said first and second bands in a laminate, and exposing back side portions of said bands on opposite sides of said laminate; and cutting said second band to define a removable label therein.

2. A method according to claim 1 wherein:

said web further includes a third band adjoining said first band; and further comprising folding said web along said fold line to join together said first and second bands in a two-ply laminate, with said third band extending from said laminate in a single-ply being coextensive with said first band.

3. A method according to claim 2 further comprising folding said web along said fold line to form an integral fold along said fold line joining together said first and second bands along a common edge of said laminate.

4. A method according to claim 3 further comprising printing said barrier coating, release, and adhesive atop said web.

5. A method according to claim 3 further comprising printing atop said barrier coating prior to applying said release atop said print.

6. A method according to claim 3 further comprising printing said web outside said release.

7. A method according to claim 6 further comprising printing both said front and back sides of said web.

8. A method according to claim 7 further comprising printing said web front side after curing said applied release and before folding said web.

9. A method according to claim 3 wherein release pattern on said first band is continuous, and said adhesive pattern on said second band is continuous.

10. A method according to claim 3 wherein release pattern on said first band is discontinuous, and said adhesive pattern on said second band is discontinuous and complementary with said discontinuous release pattern.

11. A method according to claim 3 wherein said release pattern is repetitive along said first band, and said adhesive pattern is repetitive along said second band and complementary with said repetitive release pattern.

12. A method according to claim 3 further comprising:

applying said release in a pattern atop said front side of both said first and second bands;

applying said adhesive in a pattern atop said front side of both said first and second bands; and said release and adhesive patterns are complementary to each other on said first and second bands symmetrically along said fold line.

13. A method according to claim 12 wherein said release and adhesive patterns include complementary rectangular patches nested inside each other.

14. A method according to claim 12 wherein said release and adhesive patterns include complementary alternating stripes.

15. A method according to claim 12 wherein said release and adhesive patterns include complementary checkerboards.

16. A method according to claim 3 further comprising applying said adhesive atop said front side of both said first and second bands.

17. A method according to claim 16 wherein said adhesive on both said first and second bands is aligned along said fold line to form a two-ply adhesive laminate thereof after folding together said first and second bands.

18. A method according to claim 3 further comprising embossing said fold line prior to folding said first and second bands.

19. A method according to claim 3 further comprising perforating said fold line prior to folding together said first and second bands to form a line of perforations in said fold.

20. A method according to claim 3 further comprising perforating said third band.

21. A method according to claim 3 further comprising die cutting said second band to define said label inside a surrounding matrix.

22. A method according to claim 3 further comprising removing said matrix to expose said label atop said first band.

23. A method according to claim 3 further comprising:

die cutting both said first and second bands across said fold to define a single label bridging both sides of said laminate; and applying said release and adhesive in complementary patterns on said first and second bands to provide adhesive on both said first and second bands removably bonded to opposing release also on both said first and second bands.

24. A method according to claim 3 further comprising:

die cutting both said first and second bands to define corresponding nested labels on opposite sides of said laminate; and applying said release and adhesive in nested patterns on said first and second bands to provide adhesive on both nested labels removably bonded to opposing release also on both nested labels.

25. A method according to claim 3 further comprising slitting said laminate along said fold line and removing said fold therefrom.

26. A method according to claim 3 further comprising cutting said laminated web into repeating sheets, each including one of said labels therein.

27. A method according to claim 3 further comprising folding said laminated web into a stack of fanfold sheets, each including one of said labels therein.

28. A method according to claim 3 further comprising rolling said laminated web into a roll of integral sheets, each including one of said labels therein.

29. A method according to claim 1 further comprising:

providing an apparatus for making said label laminate including:

means for dispensing from said roll said web;

means for applying said pattern of release on said web front side atop said first band;

means for applying said pattern of adhesive on said web front side atop said second band to complement said release;

means for folding said web along said fold line; and means for cutting said second band to define said removable label therein; and operating said apparatus to dispense said web from said roll, apply said release pattern, apply said adhesive pattern, fold said web, and cut said second band.

30. A method according to claim 2 further comprising:

providing an apparatus for making said label laminate including:

means for dispensing said web from said roll;

means for applying said pattern of release on said web front side atop said first band;

means for applying said pattern of adhesive on said web front side atop said second band to complement said release;

means for folding said web along said fold line to join together said first and second bands in a two-ply laminate, with said third band extending from said laminate in a single-ply being coextensive with said first band; and means for cutting said second band to define said removable label therein; and operating said apparatus to dispense said web from said roll, apply said release pattern, apply said adhesive pattern, fold said web, and cut said second band.

31. A method according to claim 30 wherein said folding means are configured and operated for folding said web along said fold line to form an integral fold along said fold line joining together said first and second bands along a common edge of said laminate.

32. A method according to claim 30 wherein said apparatus further comprises means for applying said barrier coating atop said first band prior to applying said release thereon and is operated to apply said barrier coating atop said first band.

33. A method according to claim 30 wherein said apparatus further comprises means for printing both said front and back sides of said web and is operated to print said front and back sides.

34. A method according to claim 30 wherein said apparatus further comprises means for embossing said fold line prior to folding together said first and second bands and is operated to emboss said fold line.

35. A method according to claim 30 wherein said apparatus further comprises means for perforating said web and is operated to perforate said web.

36. A method according to claim 30 wherein said apparatus further comprises means for dividing said web into a group of sheets, each including one of said labels therein and is operated to divide said web.

37. A method according to claim 1 wherein:

said first and second bands have an identical material composition with common front and back sides;

said first band has said pattern of release atop said front side thereof;

said second band has said pattern of adhesive atop said front side thereof;

said first and second bands are bonded together by said adhesive and release along said front sides thereof to form said laminate, and exposing said back sides thereof on opposite sides of said laminate; and said second band has a removable label therein defined by a die cut perimeter.

38. A method according to claim 37 further comprising a third band adjoining said first band in a coplanar single-ply therewith, with said second band joined atop said first band in a two-ply laminate.

39. A method according to claim 38 further comprising an integral fold along said fold line joining together said first and second bands along a common edge of said laminate.

40. A method according to claim 39 further comprising printing print on said first band under said release.

41. A method according to claim 39 further comprising printing print on said front side of said third band and on said back side of said second band laminated atop said first band.

42. A method according to claim 39 further comprising embossing said fold line.

43. A method according to claim 39 further comprising perforating said fold to include a line of perforations.

44. A method according to claim 39 wherein said label bridges said fold and extends on both sides of said first and second bands, with a common die cut perimeter.

45. A method for making a label laminate comprising:

dispensing from a roll a web including first and second bands adjoining along a fold line extending longitudinally along a running axis, with said web and bands thereof having a front side and an opposite back side;

applying a barrier coating on said web front side atop said first band;

applying a pattern of release atop said barrier coating;

applying a pattern of adhesive on said web front side atop said second band to complement said release;

folding said web along said fold line to bond together front side portions of said first and second bands in a laminate, and exposing back side portions of said bands on opposite sides of said laminate;

cutting said second band to define a removable label therein;

dividing said web along said running axis to produce a series of laminate sheets repeating along said running axis, and each sheet including a corresponding one of said labels therein; and stacking said laminate sheets in a group in which said opposite back side portions of each sheet adjoin each other, and said front side portions of each sheet are bonded together by said adhesive.

* * * * *